Jan. 19, 1932.  F. A. ROUTHIER  1,841,677
PRESSURE GAUGE
Filed Dec. 28, 1928
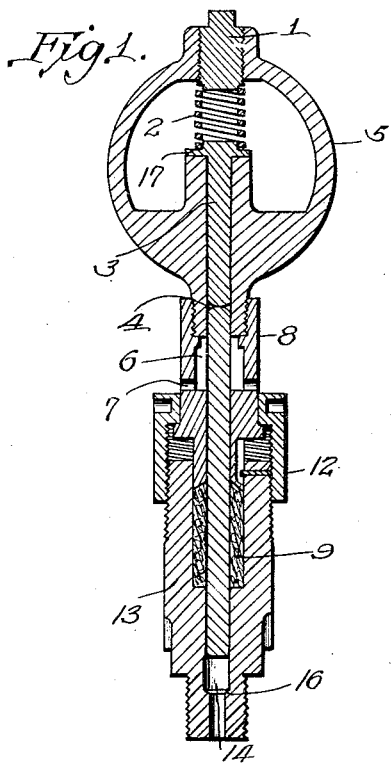
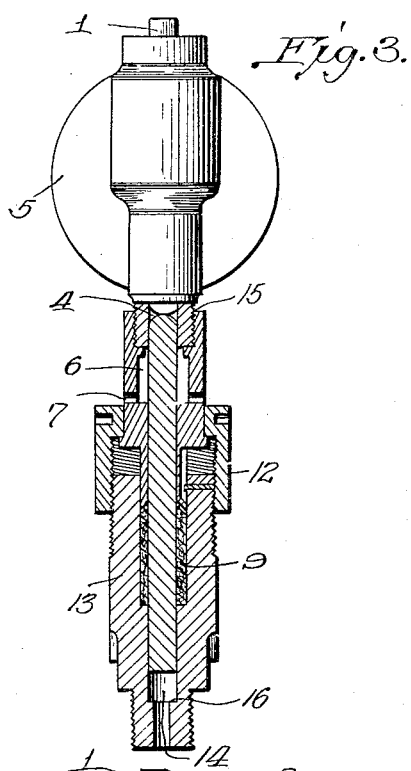
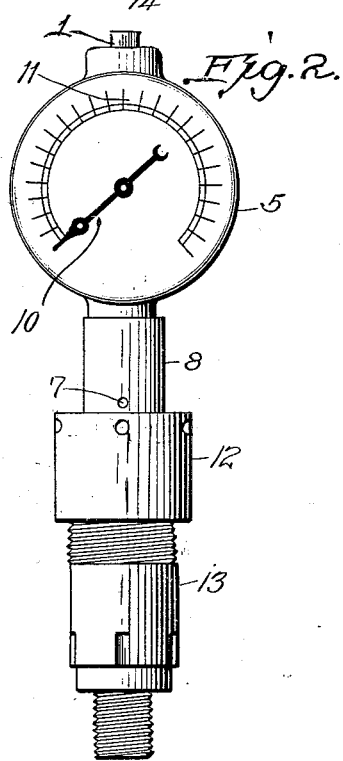
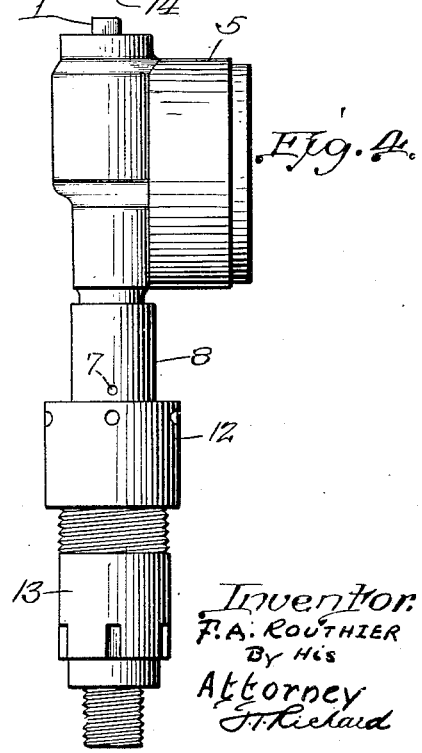
Inventor:
F. A. Routhier
By His
Attorney
J. T. Richard Patented Jan. 19, 1932

1,841,677

UNITED STATES PATENT OFFICE

FELIX ANTOINE ROUTHIER, OF MONTREAL, QUEBEC, CANADA, ASSIGNOR TO B. TRUDEL COMPANY, OF MONTREAL, CANADA

PRESSURE GAUGE

Application filed December 28, 1928, Serial No. 329,010, and in Canada April 5, 1928.

This invention relates to improvements in piston pressure gauges, which are precision instruments used on hydraulic machines to indicate pressure.

The object of the invention is to make the use of these gauges more practical and this is what I have tried to obtain in this invention,—

Firstly, this invention will permit these gauges to run with the same exactness at low as at high pressure and will facilitate their adjustment without having to open the gauge case which affects their sensitiveness. This invention will also make possible the replacement of worn out packings without removing anything from the gauge box and will also prevent the liquid from entering the gauge box and destroying the small mechanism as often happens in piston pressure gauges.

Another point, is that my invention will make these gauges more resistant and increase their durability. With the above and other objects in view which will be made clear as the specification proceeds, the invention consists of a new gauge illustrated in the drawings, described in the specification and particularly set forth in the appended claims.

I have illustrated a single embodiment of my invention but it is to be understood that I do not restrict myself to this form only, but reserve the right to alter my gauge in any manner possible so long as it comes within the scope of my claims.

In the drawings:—

Fig. 1 is a cross section of a gauge with its attachment embodying my invention.

Fig. 2 is a front view showing my invention as it appears when assembled.

Fig. 3 is a rear view of the gauge with a cross section of the attachment, showing details of the pieces and the manner in which they are assembled.

Fig. 4 is a side view of the gauge with its attachments assembled.

Referring to the drawings, Figure 1 represents my new gauge with its attachments and shows how the pieces are assembled on the inside.

The head of the screw (1) is outside of the gauge case, and permits adjustment of the tension of the spring (2) during the operation of the gauge without removing any parts, and also permits the whole mechanism to conform to such adjustment because this spring (2) acts directly on the piston rod (3) which by means of a lever system and gears communicates its movements to the indicating needle (10) which operates over a graduated disk (11).

The lever system and gears have not been illustrated because they are the same as those commonly used in such gauges.

As shown in Figures 1 and 3 the piston rod (3) has been cut at (4) and so facilitates the gauge box being taken off to replace packing (9) when worn out.

The manner of removing the gauge box is easily understood. By disconnecting the threaded nut (12) and pulling the gauge case (5), the gland (8) will follow giving access to the packing (9) and allowing changing of the same. The advantage in this case is the replacement of worn out packing without affecting the gauge exactness, as the gauge box (5) is not to be opened.

A central compartment (6) provided in the gland (8) and communicating with the atmosphere by small holes (7) allows the liquid that may leak between the packing and the piston rod to discharge outside and so prevents the liquid leaking from gaining access to the inside of the gauge box and thus destroy the delicate mechanism of the levers and gears.

The nut (12) is used to adjust the pressure of the stuffing box gland (8) on the packing (9) which is inserted around the piston rod in the cylinder of the block (13). When operating under high pressure a few turns of the nut (12) will increase the pressure of the stuffing box gland (8) on the packing (9), when low pressure is used the nut (12) is unscrewed a few turns, which decreases the pressure on the packing (9) allowing the piston rod (3) to move easier in the cylinder block (13) thus increasing its sensitiveness.

When the gauge is in operation, the piston rod (3) is pushed by the liquid under pressure making contact at (14) and this communicates the movement to the lever system fixed on the piston head (17). When the pressure is discontinued the spring (2) brings the piston (3) into position, and so moves the mechanism which brings the indicating needle back to zero position.

What I claim as my invention is:—

1. In a device of the class described, a gauge case, a piston head in said case operable in one direction under fluid pressure, means operating on the piston head in the opposite direction and tending to return it to a normal position when the fluid pressure is removed, a piston rod for the piston head extending outside the gauge case, a block having a cylindrical bore formed to provide a packing compartment into which the piston rod slidably extends, packing in the compartment co-acting with the piston rod, a stuffing box gland secured to the gauge case encircling the piston rod and engaging the packing, a nut connecting the gland to the block, said gland having a drain opening.

2. The device claimed in claim 1, in which the means tending to return the piston head to a normal position consists of a spring.

3. The device claimed in claim 1, in which the stuffing box gland is formed with a compartment with which the drain opening communicates.

4. The device claimed in claim 1, in which the piston head is carried by a piston rod operating in the gauge case, and a second piston rod slidably mounted in the cylindrical bore and abutting the first piston rod, the second piston rod having one end adapted to be subjected to fluid pressure.

5. The device claimed in claim 1, in which a screw is threaded into the gauge case and is capable of adjustment and a spring is inserted between this screw and the piston head.

Signed at Montreal, this twenty-sixth day of November, 1928.

FELIX ANTOINE ROUTHIER.